United States Patent [19]
Schafer et al.

[11] 4,008,906
[45] Feb. 22, 1977

[54] BALL COUPLING

[75] Inventors: Richard Arthur Schafer, Traer; Bennie Joe Vaughn, Cedar Falls, both of Iowa

[73] Assignee: Deere & Company, Moline, Ill.

[22] Filed: Dec. 19, 1975

[21] Appl. No.: 642,557

[52] U.S. Cl. .............................................. 280/511
[51] Int. Cl.² .......................................... B80D 1/06
[58] Field of Search ............ 280/511; 403/140, 135

[56] References Cited
UNITED STATES PATENTS

| | | | |
|---|---|---|---|
| 2,549,178 | 4/1951 | Dear | 280/511 |
| 2,558,906 | 7/1951 | Leon | 280/511 |

FOREIGN PATENTS OR APPLICATIONS

| | | | |
|---|---|---|---|
| 104,206 | 4/1942 | Sweden | 280/511 |

Primary Examiner—Robert R. Song

[57] ABSTRACT

A ball coupling includes a tractor drawbar mounted hitch ball, substantially englobed by a cap assembly which is slidable on the hitch ball. The cap assembly includes a cap having a frusto-conical surface which non-rotatably engages a frusto-conical through opening in an implement drawbar attached adapter. A lockable fastener abuts the adapter and protrudes into the smaller base of the adapter opening and threads into a threaded hole in the smaller base of the cap to draw the cap assembly into the adapter.

8 Claims, 1 Drawing Figure

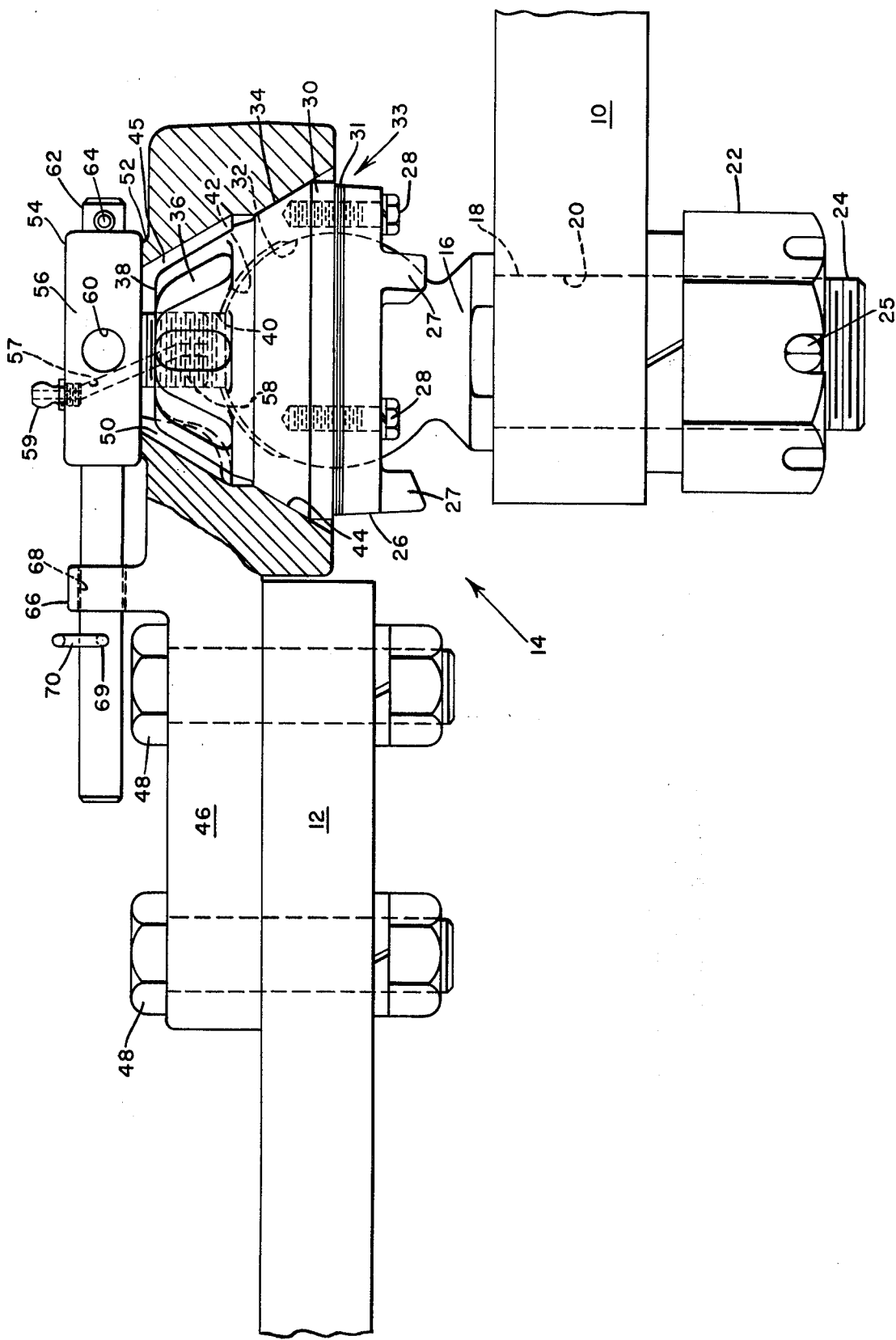

BALL COUPLING

BACKGROUND OF THE INVENTION

The invention relates generally to ball couplings and more particularly to a coupling which separates the oscillation surface and the implement coupling surface.

In the past, ball couplings utilized the same surfaces for both oscillation and implement coupling as shown in Geresy (U.S. Pat. No. 3,226,133), Seeley (U.S. Pat. No. 3,184,254), Kirk et al (U.S. Pat. No. 3,163,445), and Peters (U.S. Pat. No. 3,049,366). As tractor size increased and hitch sizes increased, increased implement loads resulted in increased wear which necessitated frequent replacement of either the ball or the socket or both.

SUMMARY OF THE INVENTION

The present invention provides a ball coupling in which the oscillation and implement coupling surfaces are separate. The coupling includes a cap assembly having an inner surface which is adjustable to englobe the drawbar mounted ball to provide an oscillation surface and having an outer surface configured to easily be drawn into engagement with an implement drawbar mounted adapter by a lockable fastener.

BRIEF DESCRIPTION OF THE DRAWING

The drawing is a side view, partially in section, showing the present invention.

DESCRIPTION OF THE PREFERRED EMBODIMENT

Referring now to the drawing, therein is shown a tractor drawbar 10 which is connected to a conventional tractor (not shown) and an implement drawbar 12 connected to a conventional implement (not shown) by a ball coupling generally designated by the number 14.

The ball coupling 14 includes a hitch ball 16 having a stud 18 inserted in a hole 20 in the tractor drawbar 10. The ball 16 is secured to the tractor drawbar 10 by means of a nut 22 which is threaded on the threaded portion 24 of the stud 18 and locked in place by cotter pin 25.

A collar 26 encircles a segment of the ball 16 and is placed around the ball before mounting the ball 16 on the tractor drawbar 10. The collar 26 has a number of movement limiting bosses 27 around its periphery and a series of fasteners 28 fasten the collar 26 to a frusto-conical cap 30. Between the collar 26 and the cap 30 are a plurality of shims 31; the collar 26, the shims 31, and the cap 30 define a cap assembly 33.

The cap 30 contains a hemispherical opening 32 which mates with the spherical surface of the ball 16. The outer surface of the cap 30 has a frusto-conical surface 34. The surface 34 includes a plurality of indentations 36 which extend parallel to the slant height of the frusto-conical surface 34. The smaller base 38 of the frusto-conical cap 30 has therein a threaded through hole 40 which intersects the hemispherical opening 32 and a series of lubrication grooves 42 in the wall of the hemispherical opening 32.

The frusto-conical surface 34 engages the frusto-conical inner surface 44 of an adapter 46 which is secured to the implement drawbar 12 by conventional bolts 48. A protrusion 50 extends into the frusto-conical volume formed by the frusto-conical inner surface 44 and engages one of the indentations 36.

The adapter 46 has a raised rim 52 surrounding the smaller base opening of the frusto-conical volume 45. Abutting the rim 52 is a screw member 54 having a knurled head portion 56 and a threaded portion 58. The threaded portion 58 threadedly engages the threaded hole 40 and draws the cap 30 into engagement with the adapter 46 upon rotation of the screw member 54. The knurled portion 56 further contains a number of through holes 60 perpendicular to the axis of the threaded portion 58. The screw member 54 contains an axial through hole 57 which connects a conventional grease fitting 59 to the lubrication grooves 42 in the cap 30.

A rod 62 is insertable in the holes 60 in the screw member 54. It contains a pin 64 at one end which prevents the rod 62 from being pulled all the way through the holes 60. The rod 62 will extend through the holes 60 and into a hole 68 in a projection 66 on the adapter 46. The rod 62 further includes a hole 69 for the insertion of a conventional spring locking pin 70 which prevents the rod 62 from being withdrawn from the hole 68 after it is inserted.

The ball coupling 14 is first set into operative condition by adding or removing shims 31 to or from between the collar 26 and the cap 30 to change the clearance therebetween until all the free play is taken up between the ball 16, the cap 30 and the collar 26. The tractor is then driven up to the implement and positioned to cause the cap 30 to engage the adapter 46. The bosses 27 prevent the cap 30 from being shifted into a position in which the adapter 46 or cap 30 or ball 16 or collar 26 may be damaged during engagement. The screw member 54 is then threaded into the threaded hole 40 causing the cap 30 to be brought into engagement with the adapter 46. Further tightening will cause protrusion 50 to engage one of the indentations 36 so as to prevent relative movement between the frusto-conical implement coupling surfaces 34 and 44 and allow mating contact therebetween.

A grease type lubricant is then introduced to the peripheral area of the ball 16 through the grease fitting 59 to lubricate the surface between the cap assembly 33 and the ball 16 which defines an oscillating surface.

Once the surfaces 34 and 44 mate, the rod 62 is inserted through a hole 60 in the narrow piece 56 and thence through the hole 68 in the adapter 46 to first provide a lever to tighten the cap assembly 33 to the adapter 46 so that a separate wrench is not required and then prevent further rotation of the screw member 54. To prevent the rod 62 from working out, a spring locking pin 70 is inserted therein.

Thus a ball coupling has been shown in which the oscillation and implement coupling surfaces are separate. While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A coupling comprising: a hitch ball; frusto-conical cap means having a hemi-spherical opening provided therein for engaging the hitch ball; collar means for encircling a spherical segment of the hitch ball and operatively connected to the cap means to substantially englobe the hitch ball; adapter means having a frusto-conical opening provided therein for receiving the cap means; and securing means for releasably drawing the cap means into engagement with the adapter means.

2. The coupling as claimed in claim 1 wherein the collar means includes fastener means for securing the collar means to the cap means, and removable shim means disposed between the collar means and the cap means and cooperating therewith to form an inner, substantially spherical, surface to mate with the outer, substantially spherical, surface of the hitch ball.

3. The coupling as claimed in claim 1 wherein the adapter means includes a protrusion extending into the frusto-conical opening and the frusto-conical cap means includes a plurality of indentations matable with the protrusion whereby sliding between the cap means and the adapter means is prevented.

4. The coupling as claimed in claim 1 wherein the collar means includes protrusions for limiting the movement of the cap means relative to the hitch ball.

5. The coupling as claimed in claim 1 wherein the frusto-conical opening of the adapter means is a through opening, the cap means includes a threaded through hole in the smaller base of the frusto-conical cap means to the hemi-spherical opening, and the securing means includes screw means having a head portion larger than the smaller base opening and a threaded body portion smaller than the smaller base opening and protruding therethrough to engage the threaded through hole in the cap means.

6. The coupling as claimed in claim 5 wherein the screw means is rotatable to draw the cap means into engagement with the adapter means, the securing means includes a bar insertable in the head portion and extending therefrom perpendicular to the body portion, and the adapter means includes means engageable with the bar to prevent rotation of the screw means.

7. The coupling as claimed in claim 6 wherein the cap means includes lubricating grooves provided in the hemi-spherical opening and connected to the threaded through hole for the introduction of lubricant between the cap means and the hitch ball and the screw means includes a lubricant passage provided therein connected to the threaded through hole for the introduction of lubricant thereto.

8. A coupling comprising: a hitch ball; frusto-conical cap means having a hemi-spherical opening provided therein for engaging the hitch ball, said cap means further having a threaded axial through hole provided therein, and said cap means having a plurality of indentations therein in the slant surface thereof; collar means for encircling a spherical segment of the hitch ball; shim means disposed between the collar means and the cap means and cooperating therewith to form an inner spherical surface to mate with the outer spherical surface of the hitch ball; means for securing the collar means and shim means to the cap means; adapter means having a frusto-conical through opening provided therein and a protrusion provided therein extending into the opening for engaging an indentation in the cap means; screw means abutting the adapter means and projecting into the smaller base of the frusto-conical opening to rotatably engage the threaded hole in the cap means and draw the cap means into engagement with the adapter means; and locking means operatively associated with the adapter means and the screw means to releasably prevent rotation of the screw means.

* * * * *